United States Patent
Koch et al.

(10) Patent No.: US 11,110,516 B2
(45) Date of Patent: Sep. 7, 2021

(54) ADDITIVE PRODUCTION METHOD

(71) Applicant: Ford Global Technologies, LLC, Dearborn, MI (US)

(72) Inventors: Raphael Koch, Odenthal (DE); Bruno Alves, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 15/719,605

(22) Filed: Sep. 29, 2017

(65) Prior Publication Data

US 2018/0093350 A1    Apr. 5, 2018

(30) Foreign Application Priority Data

Sep. 30, 2016    (DE) .......................... 102016219037.7

(51) Int. Cl.
*B22F 10/20* (2021.01)
*B22F 10/73* (2021.01)
(Continued)

(52) U.S. Cl.
CPC .............. *B22F 10/20* (2021.01); *B22F 10/40* (2021.01); *B22F 10/73* (2021.01); *B33Y 10/00* (2014.12); *B33Y 30/00* (2014.12); *B23K 26/082* (2015.10); *B23K 26/0838* (2013.01); *B23K 26/12* (2013.01); *B23K 26/123* (2013.01); *B23K 26/127* (2013.01); *B23K 26/342* (2015.10); *Y02P 10/25* (2015.11)

(58) Field of Classification Search
CPC .................................................... B29C 64/357
See application file for complete search history.

(56) References Cited

U.S. PATENT DOCUMENTS 7,828,022 B2    11/2010    Davidson et al.
7,971,991 B2 *    7/2011    Davidson ............... B29C 64/35
                                                                347/108
(Continued)

FOREIGN PATENT DOCUMENTS

CN    103552239    2/2014
WO    2012076205    6/2012
(Continued)

OTHER PUBLICATIONS

Gibson et al. Additive Manufacturing Technologies: Rapid Prototyping to Direct Digital Manufacturing. Springer. (2010) (Year: 2010).*

*Primary Examiner* — Keith D. Hendricks
*Assistant Examiner* — Joshua S Carpenter
(74) *Attorney, Agent, or Firm* — Burris Law, PLLC

(57) ABSTRACT

The present disclosure provides an additive production method of producing an object by metal powder being applied in a production region in layers by an application device. The metal powder is applied to a base member along a construction face and is partially molten by a laser beam and solidified. A continuous conveyor transports the base member with the object in a transport direction away from the construction face. The continuous conveyor further transports the base member with the completed object to a removal region where the object is removed from the continuous conveyor. Support structures are produced on the object and are connected to the base member. The support structures are removed after the removal region has been reached.

13 Claims, 2 Drawing Sheets

Figure 1:
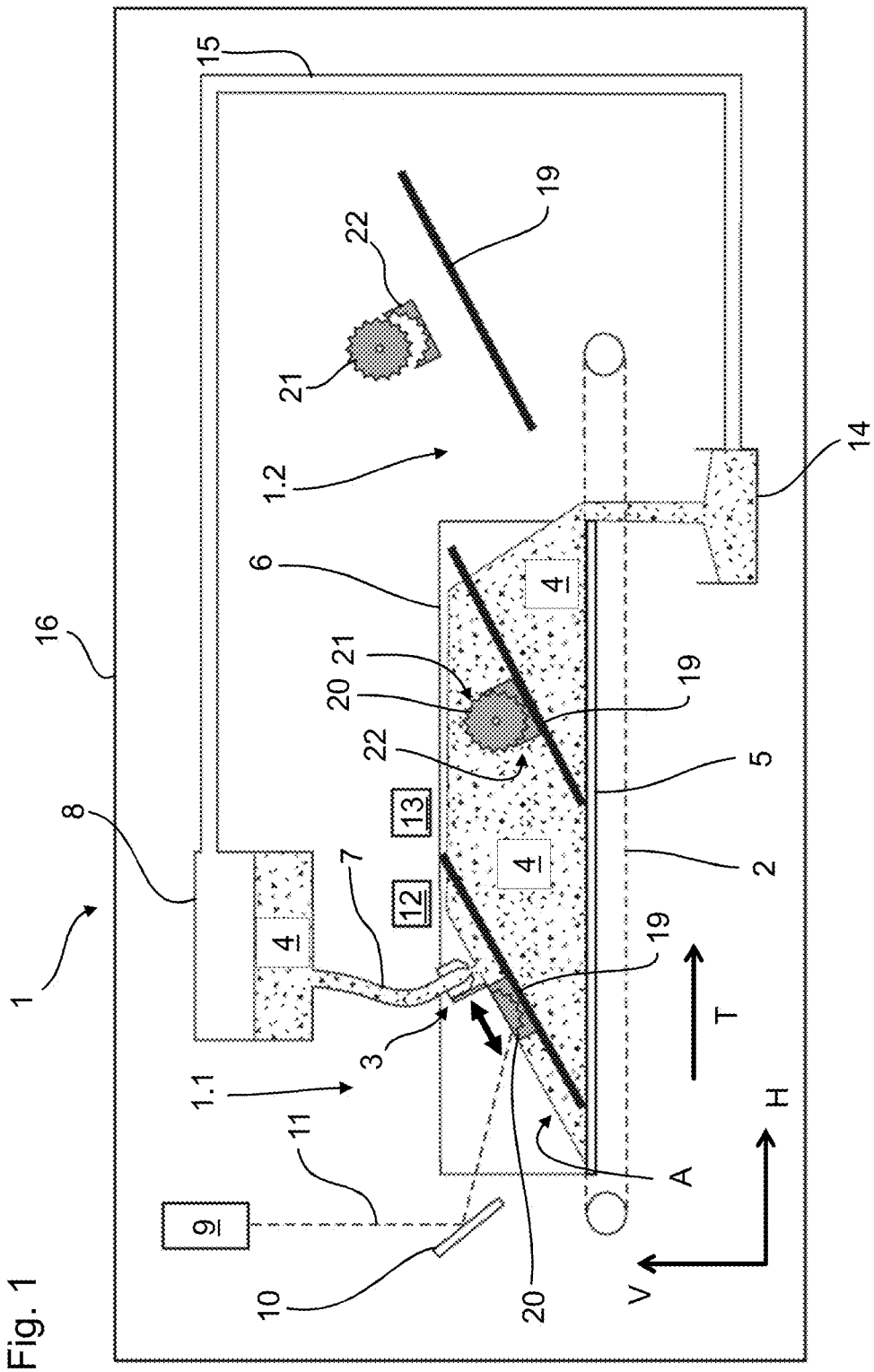

(51) Int. Cl.
    *B22F 10/40*       (2021.01)
    *B33Y 10/00*       (2015.01)
    *B33Y 30/00*       (2015.01)
    *B23K 26/12*       (2014.01)
    *B23K 26/082*     (2014.01)
    *B23K 26/342*     (2014.01)
    *B23K 26/08*       (2014.01)

(56) References Cited

U.S. PATENT DOCUMENTS

| | | | |
|---|---|---|---|
| 9,914,169 B2 * | 3/2018 | Ederer | B22F 3/105 |
| 2015/0290881 A1 * | 10/2015 | Ederer | B29C 64/357 |
| | | | 264/109 |
| 2016/0067923 A1 * | 3/2016 | James | B22F 3/1055 |
| | | | 264/497 |

FOREIGN PATENT DOCUMENTS

| | | |
|---|---|---|
| WO | 2014070007 | 5/2014 |
| WO | 2015163765 | 10/2015 |
| WO | 2015167335 | 11/2015 |

\* cited by examiner

ADDITIVE PRODUCTION METHOD

CROSS-REFERENCE TO RELATED APPLICATIONS

This application claims priority to and the benefit of DE 102016219037.7 filed on Sep. 30, 2016. The disclosure of the above application is incorporated herein by reference.

FIELD

The present disclosure relates to an additive production method.

BACKGROUND

The statements in this section merely provide background information related to the present disclosure and may not constitute prior art.

There are currently a variety of methods by means of which based on construction data three-dimensional models can be produced from shapeless or shape-neutral materials, such as powders (optionally with the addition of a binding agent) or liquids (which also occasionally includes molten solids). These methods are also known under collective terms such as "Rapid Prototyping", "Rapid Manufacturing" or "Rapid Tooling". In this instance, an initial forming step is often carried out in which the starting material is either present from the outset in liquid form or is liquefied in the meantime and cures at an intended location. A known method in this instance is so-called fused deposition modeling (FDM) in which a workpiece is constructed in layers from thermoplastic plastics material. The plastics material is, for example, supplied in the form of powder or a strand, molten and applied in molten form by a pressing head which applies sequentially individual, generally horizontal layers of the object which is intended to be produced.

In addition, methods are known in which a powdered material, for example, a plastics material, is applied in layers and selectively cured by means of a locally applied or pressed-on binding agent. In different methods again, such as, for example, selective laser sintering (SLS), a powder, for example, using a scraper, is applied in layers to a construction platform. The powder is selectively heated by means of appropriate focused radiation, for example, a laser beam, and thereby sintered. After the construction of a layer, the construction platform is lowered slightly and a new layer applied. In this instance, plastics materials, ceramic material or metals can be used as the powder. The non-sintered powder has to be removed after the production process. This and the fact that the platform is lowered downward into a powder bed, normally in the direction of a container base, complicates the method sequence. Before a new component can be produced, the installation has to be stopped, the powder bed removed or the construction platform removed and the component removed from the powder bed. Series production is not possible using such methods.

U.S. Patent Publication No. 2015/0290881 A1 sets out a device for producing three-dimensional models. A coater is configured to discard particle-like material and, for example, smooth it in layers using a blade. The individual layers are in this instance arranged in an oblique plane. A print head can be moved in a two-dimensional manner within this plane. Using the print head, a binding agent can be discharged, but it is alternatively also possible to discharge a high-energy radiation, for example, for selective laser sintering. A model is gradually constructed by means of layering within the plane mentioned. As a result of a conveyor belt, the model is further moved in a horizontal manner during the construction process.

U.S. Pat. No. 7,828,022 B2 discloses a powder container for discharging powder for a three-dimensional printer. The powder container comprises in this instance a chamber for receiving powder, wherein the chamber defines with respect to a construction face of the printer an outlet which is configured to allow through a predetermined quantity of powder. Furthermore, there is provided a discharge mechanism which is arranged at least partially in the chamber and which is configured to press the powder through the outlet. Via a pressure reduction system, excess powder is drawn out of the production process and returned to the powder container. The construction face on which a three-dimensional model is produced is orientated horizontally and is moved vertically.

CN 103552239 A discloses a 3D printer with material recovery. In this instance, a production container which comprises a horizontal platform and four stationary walls is filled with a powder material and in the powder a three-dimensional model is produced in layers, wherein the platform is moved gradually downward. The transition from the platform to the walls is, for example, sealed by means of sealing rubber members. A wall is adjoined by a line which is connected to a pressure reduction source. Powder can thereby be drawn from the production container to a collection container and consequently reused.

The efficiency of additive production methods is addressed by the present disclosure.

SUMMARY

According to the present disclosure, an additive production method is provided. The method can be associated with the field of Rapid Prototyping or Rapid Manufacturing. As will become clear, however, it is not only suitable for production of prototypes or individual models, but also in particular for series production.

In the method according to the present disclosure, an object is produced by metal powder being applied in a production region in layers by an application device to a base member along a construction face, being partially molten by means of a laser beam and solidified, whilst at least one continuous conveyor transports the base member with the object in a transport direction away from the construction face. The base member may, for example, be constructed as a base plate.

The production region is in this instance the region in which the actual production or the actual construction of the object is carried out. Any powder-like or particle-like material which contains at least one metal is referred to as a metal powder in this instance. It may also be an alloy or an admixture of particles of different metals. The powder may also contain metalloids or non-metals, for example, as a component of an alloy. Metals which may be considered include inter alia aluminum, titanium and iron.

The application device applies in each case a layer of this powder along a construction face. The layer thickness may in this instance, for example, be between 10 μm and 500 μm, wherein other layer thicknesses are also conceivable. Such an application device may have one or more discharge openings, from which the powder is discharged, for example, as a result of gravitational force. In order to enable a smooth and uniform layer construction, the application device may comprise a smoothing device, for example, a scraper, brush or blade, which is moved parallel with the construction face and which smoothes the surface of the powder. Generally, the construction face is planar, whereby it is also possible to refer to a construction plane. The application is carried out in this instance in layers to a base member, that is to say, the first layer is applied directly to the base member, after which the additional layers are applied successively one above the other.

In one form, the base member has a planar surface which is orientated parallel with the construction face. The base member may in particular also be constructed as a base plate or bottom plate or have a base plate. In one form, the base member comprises at least for the most part a material having a high level of thermal conductivity, for example, a metal. After the application of a respective layer, the powder is partially molten by a laser beam and subsequently solidifies. In this manner, a cohesive solid body is produced from the powder. At the same time, the powder of the layer which was added last is molten with the solid body structures of the layer below or a plurality of layers below, whereby cohesion of the layers with each other is produced. Inter alia depending on the layer thickness, it is possible for the laser beam to melt the material up to a depth which corresponds to a plurality of layer thicknesses.

In the context of a selective production method, the laser beam acts in this instance normally in accordance with a specific pattern. It could also be said that a predetermined face is irradiated. In this instance, it is possible, for example, for a scanning of the face to be carried out by means of a narrowly focused laser beam or for a specific beam pattern to be projected at once. Different scanning patterns are possible, for example, the contour of a face can be traveled first and afterwards the inner side thereof or vice versa. The orientation of the laser beam with respect to the construction face is carried out in this instance generally not by means of a movement of a laser itself, but instead by a beam which is produced by the laser being redirected by means of at least one movable mirror. Of course, the spatial or temporal beam pattern of the laser beam can be controlled in accordance with predetermined data (for example, CAM data) of an object which is intended to be produced. The irradiated face corresponds in this instance to a (generally planar) cross section of the object. On the whole, the method according to the present disclosure may be classified as "selective laser melting" (SLM). Such a method may also be referred to as "application welding."

During the layered application, melting and solidification, at least one continuous conveyor transports the base member with the object in a transport direction from the construction face. The at least one continuous conveyor may be constructed in different manners, for example, as a belt conveyor or chain conveyor. A plurality of continuous conveyors may also be provided, wherein for reasons of simplification "a" or "the" continuous conveyor will be referred to below but will nonetheless always be intended to be understood to mean "at least one" or "the at least one" continuous conveyor. The continuous conveyor predetermines a movement sense or a movement direction in which the base member is transported, that is to say, a movement reversal is normally not provided. Of course, the transport is normally carried out intermittently, that is to say, discontinuously, wherein a layer is applied whilst the continuous conveyor is stopped, and the base member with the object is transported further (in accordance with a layer thickness) only when the layer has been fully applied. The action of the laser beam is also normally carried out with the base member at rest. However, continuous transport would also be theoretically conceivable, wherein the movement of the application device and the control of the laser beam would have to be adapted to the movement of the continuous conveyor. The transport direction extends in this instance of course at an angle with respect to the construction face. The layered structure described and the successive transport of the base member with the object is continued until the object is finally completed (for example, in accordance with fundamental CAM data).

The base member not only forms in the method according to the present disclosure a mechanical basis for the production of the object, but instead it also has a function for discharging heat. As a result of the melting of the powder, the completed object is also further heated (under some circumstances considerably) after the solidification. A good thermal discharge from the object is not possible either to surrounding gases or by powder which is adjacent to the object since both are relatively poor heat conductors. However, since the construction of the object is carried out on the base member, heat can be discharged to the base member, whereby excessive heating of the object produced is inhibited. A thermally caused deformation, for example, bending of the object, is thereby also at least substantially inhibited. Without the presence of the base member, the object could become so heavily deformed that, for example, the application of a subsequent powder layer would be impeded.

According to the present disclosure, the at least one continuous conveyor further transports the base member with the completed object to a removal region, where at least the object is removed from the continuous conveyor. The removal of the object may, of course, be carried out in an automated manner by means of grippers, magnets or other suitable devices. If the object without the base member is removed from the continuous conveyor, the removal or where applicable separation of the object from the base member can proceed. During the production method, it is possible, and considering aspects of heat discharge where applicable even desirable, for a materially integral and/or positive-locking connection to be produced between the completed object and the base member so that the object cannot be lifted in a simple manner from the base member. In this case, the object is first released from the base member using a suitable separation method. The removal is carried out in any case in a removal region which in accordance with the conveying movement of the continuous conveyor is arranged with spacing from the production region or which where applicable is adjacent thereto. This in turn means that the production region becomes free again in order to produce another object on another base member. It is not necessary to wait until the previously produced object has been removed and/or the base member has been cleaned.

Generally, the method is at least partially carried out in a housing which, for example, may at least partially surround the application device and the continuous conveyor. As a result of such a housing, it is possible, on the one hand, to inhibit powder from leaving the actual production region in an uncontrolled manner and consequently contaminating other regions. In particular, however, it is more readily possible within such a housing to carry out at least portions of the method in an inert gas atmosphere (or in an atmosphere which is enriched with inert gas and which has a significantly reduced oxygen content compared with air), whereby an oxidation or even combustion or explosion of the metal powder can be inhibited.

According to the present disclosure, there are produced on the object support structures which are connected to the base member and which are removed after the removal region has been reached. The support structures which, in the same manner as the remainder of the object, are produced by means of melting and solidification of the metal powder are in this instance purely auxiliary structures which are not part of the desired final shape of the object. They may perform different functions. On the one hand, they can be used to stabilize the object during the production and further transport, for example, to inhibit tipping of the object. On the other hand, however, they can also improve the thermal connection to the base member so that heat can be better discharged from the object. Furthermore, they may be arranged between the base member and the desired final shape of the object (it could also be said, the useful portion or the actual component) so that the final shape is connected to the base plate only indirectly via the support structures. It is thereby more readily possible to separate the final shape from the base plate and reducing the risk of damage. In particular, the support structures may extend perpendicularly to the construction face in this case. Such support structures may be in the form of retention members, suspensions, supports, stilts or the like. They may also have an open, for example, grid-like, net-like or honeycomb-like structure. Since these support structures do not belong to the actually desired shape of the object, they are removed after the object has reached the removal region, which includes the possibility of other method steps being interposed between reaching the removal region and the removal. The separation of the support structures may under some circumstances be carried out mechanically by means of breaking off, cutting off, sawing or milling and/or by means of other suitable methods, such as, for example, water jet cutting, laser cutting or erosion. It is conceivable in this instance for the support structures to first remain connected to the base member and only to be separated from the object. Alternatively, the object including the support structures may also be separated and removed from the base member, wherein the support structures are subsequently removed from the object. It is also conceivable that the support structures are severed, wherein a portion thereof initially remains on the base member and another portion remains on the object.

Various forms of the method according to the present disclosure are conceivable in which the base member remains connected to the continuous conveyor. For example, the base member could be assembled on a belt conveyor, chain conveyor or the like, and, after the object has been removed, could be transported back into the production region again. In many cases, however, it is more favorable for the base member to be removed from the continuous conveyor in the removal region. This in particular includes the option of the base member being removed from the continuous conveyor together with the completed object (including the support structures). In this instance, the base member and the object may optionally together be subjected to a thermal processing operation. Such a thermal processing operation may, for example, be used where applicable to reduce inherent tensions or in order to subject the object to a thermal reprocessing operation. In this instance, the desired final shape of the object (that is to say, the usable portion thereof) is fixed by means of the support structures to the base plate and thus secured against torsion. Alternatively, it would also be conceivable for the object first to be removed from the base member and subsequently for it to be removed from the continuous conveyor. The removed base member may optionally be cleaned of powder residues and where applicable any remaining support structures in a region provided for this purpose and subsequently used again.

With regard to the orientation of the construction face and the transport direction, different configurations are possible, of which a few will be discussed below. In this instance, the base member in each case has a surface which extends parallel with the construction face. It is also generally economical for the angle between the transport direction and the construction plane not to be excessively small, for example, to be at least 30°.

According to one form, the construction face extends at an angle relative to the horizontal which is less than the angle of repose of the powder. This means that the construction face does not extend horizontally, but instead at an angle (not equal to zero) with respect to the horizontal. In order to inhibit sliding or trickling of the applied powder, however, the angle should be smaller than the angle of repose of the powder. It may be said in this case that the powder is applied along an inclined plane. Such a form enables the base member to be transported sideways, that is to say, not perpendicularly.

In particular, but not only, in the above-mentioned form, the transport may be carried out at least primarily in a horizontal manner. In this instance, the transport direction advantageously assumes an angle of a maximum of 30° with respect to the horizontal. The horizontal or level is in this instance the plane which extends perpendicularly to the active direction of gravitational force. The angle mentioned may in particular be a maximum of 20° or a maximum of 10°. In particular, the transport direction may be located in the horizontal.

According to another form, the construction plane extends horizontally. In this form, horizontal powder layers are layered one above the other (in a vertical direction). Under some circumstances, this form may also be advantageous since the applied powder is supported from below by the base member and consequently at most trickling is inhibited at the sides, for example, by means of lateral support walls.

In yet another form, which can be combined with the one mentioned above, the transport direction assumes an angle of a maximum of 30° with respect to the vertical. The vertical corresponds in this instance to the active direction of gravitational force. The angle mentioned may in particular be a maximum of 20° or a maximum of 10°. In particular, the transport direction may be located in the vertical. In these statements, no orientation (upward or downward) of the vertical is considered. In an at least primarily vertical transport direction described in this instance, there may be provided two continuous conveyors which extend in parallel and between which the base member is arranged, wherein each of the continuous conveyors supports an end of the base member. In the discharge region, the base member can then be released from the continuous conveyors.

The construction of a stable, closed layer of powder in the region of the construction face is significant for controlled production of the object. Since the successively applied powder layers rest to a significant degree one on the other (and normally to a lesser degree on the already completed portions of the object), the powder has to be inhibited on the whole from becoming destabilized during the construction. On the other hand, after the completion of the object, it is possible to use the influence of gravitational force to free it at least partially from excessive powder residues. As a result of these considerations, it is desired in the production region for an at least lower-side support to inhibit trickling of powder, whilst in the removal region powder trickles away as a result of gravitational force. In this context, no distinction is made between "trickling" and "falling". The support may in particular completely inhibit the trickling. It is provided at least at the lower side, but can additionally also be provided at the sides (that is to say, in a horizontal direction), for example, by means of lateral support walls. A lower-side support may, for example, be located at the base of the base member or therebelow. In the case of a primarily horizontal transport direction, it is possible to use, for example, a conveyor belt which has an open surface structure. In the production region there may be arranged below the actual conveyor belt a closed surface, for example, a metal sheet or the like, which forms a lower-side support by powder being inhibited from falling through the open surface of the actual belt, whereby on the whole powder cannot trickle away or can hardly trickle away. The closed surface may in this instance be present in the production region, whilst it is missing in the removal region. This leads to powder being able to fall through the open surface and the applied powder, as long as it has not been molten, trickling or falling at least partially from the object or base member as a result of gravitational force. The open structure of the conveyor belt in this instance forms a plurality of lower-side openings. However, this is only one example. The lower-side support may be completely or partially also formed by the base member itself. This is, for example, the case when the construction face and a surface of the base member (for example, a base plate) extend precisely or almost horizontally. As indicated above, in this instance, the base member may be arranged between two continuous conveyors, wherein it is decoupled from the conveyors at a lower end of the conveyor or falls therefrom. Consequently, the lower-side support of the powder which at least partially trickles or falls away is also omitted.

From economical viewpoints, it is desired for powder to be returned from the removal region to the application device. Where applicable, in this instance, a preparation or sorting and sieving of the powder is interposed if it has deteriorated in terms of its quality, for example, as a result of oxidation or thermal influences. The powder can initially be returned from the removal region to a storage container, which in turn is connected to the application device and supplies it. The return may be carried out at least partially by an air flow, for example, by the powder being drawn from the removal region or a region below and directed further using corresponding pipelines.

It should be noted that with each of the variants set out above, there may be provided at the side of the continuous conveyor boundary walls or support walls which extend parallel with the transport direction and which inhibit powder from sliding or falling in an undesirable manner from the base member or the continuous conveyor. In one variation, in which the transport direction extends primarily in a vertical direction, such walls may form a channel which closes the continuous conveyor(s) all the way around.

The possibilities of the method according to the present disclosure extend beyond the conventional production of individual prototypes or models. In fact, proper series production is possible which with conventional SLM methods is already inhibited by the fact that the completed object is in each case produced on a platform and first has to be removed therefrom before an additional object can be produced. This issue does not arise with the method according to the present disclosure since the completed object is transported by the continuous conveyor into the removal region and consequently releases the production region. After the production of an object, an additional base member can be positioned at that location and the production of the next object can be commenced. According to such a form, the production of the next object begins whilst the (previously completed) object is transported to the removal region. The further transport of the initially produced object is therefore carried out in this instance temporally parallel with the production of the subsequent object. A genuine series production is thus possible. This implies that the continuous conveyor simultaneously transports a plurality of base members. The base members may be permanently connected to the continuous conveyor or, as is generally more favorable, be placed in each case on the continuous conveyor in the production region and removed again in the removal region.

Further areas of applicability will become apparent from the description provided herein. It should be understood that the description and specific examples are intended for purposes of illustration only and are not intended to limit the scope of the present disclosure.

DRAWINGS

Figure 2:
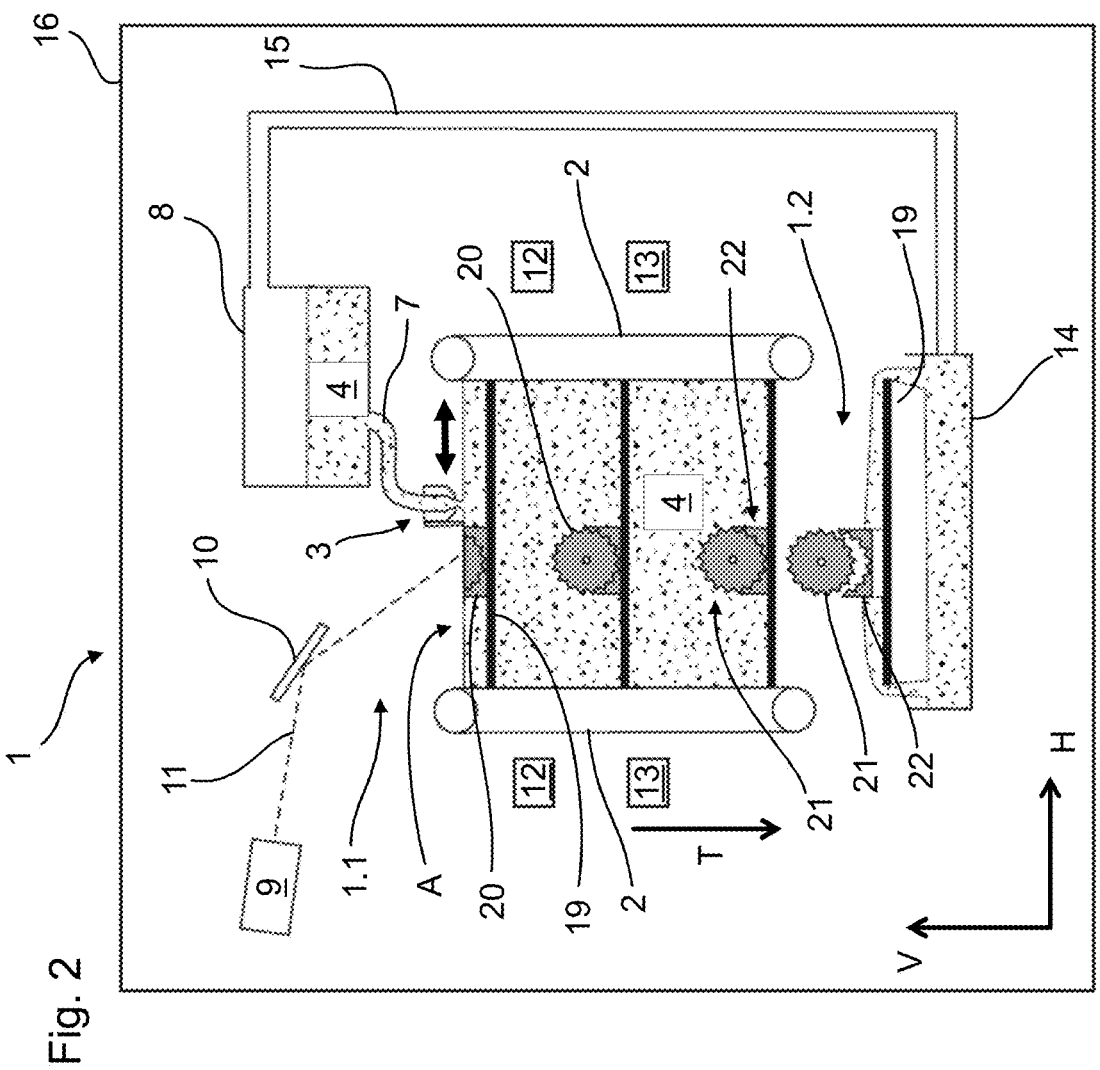

In order that the disclosure may be well understood, there will now be described various forms thereof, given by way of example, reference being made to the accompanying drawings, in which:

FIG. 1 is a schematic illustration of one form of a device for carrying out an additive production method according to the present disclosure; and FIG. 2 is a schematic illustration of another form of a device for carrying out an additive production method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows one form of a production installation 1 by means of which the method according to the present disclosure can be carried out.

A horizontally extending belt conveyor 2 transports a plurality of base members 19. The base member 19 may also be constructed as a bottom plate, but is referred to below as a base plate 19. An object 20 is produced by additive production on a base plate 19 in a production region 1.1.

In the production region 1.1, using an application device 3, metal powder 4 is applied to the base plate 19 in layers over a construction face A. The construction face A extends in this instance parallel with the surface of the base plate 19.

The application device 3 may have a type of nozzle or valve for discharging powder and a smoothing device, for example, a scraper. As illustrated by the double-headed arrow, the application device 3 can be moved parallel with the construction face A in order to distribute powder 4 along the entire construction face A. As indicated by the dashed line, the belt conveyor 2 has an open structure which is permeable to the powder 4. In the production region 1.1, however, there is provided a bottom plate 5 which inhibits powder 4 from falling down or sliding. The bottom plate 5 is adjoined at both sides by side walls 6 which inhibits lateral trickling of powder 4.

If the application device 3 which is connected to a storage container 8 by means of a supply line 7 has applied a layer of metal powder 4, a portion of the powder 4 is selectively molten using a laser beam 11, whereby a layer of an object 20 which is intended to be produced is produced. In order to inhibit oxidation or even an explosion of the powder 4, the whole production installation 1 is arranged in a housing 16 which is filled with inert gas or into which inert gas is continuously blown, whereby the oxygen content is kept low.

The laser beam 11 is produced by a laser 9 and directed via a pivotable mirror 10 onto a provided coordinate location within the construction face A. The activation of the laser 9 and the control of the mirror 10 are carried out in this instance in a computer-controlled manner in accordance with predetermined CAM (Computer Aided Manufacturing) data of the object 20. The belt conveyor 2 is in this instance operated in an intermittent manner, that is to say, it is stopped whilst a powder layer is applied and partially molten and subsequently transports the base plate 19 with the object 20 in a transport direction T from the construction face A by a distance which corresponds to the provided layer thickness (as a result of the inclination of the construction face A, this distance is naturally greater than the actual layer thickness). The transport direction T extends in the present example parallel with the horizontal H.

As a result of the action of the laser beam 11, the object 20 produced is heated significantly, although the molten powder solidifies again when the action of the laser beam 11 is ended. Since an effective heat discharge is possible neither to the surrounding powder 4 nor to the inert gas, it is advantageous for inhibiting thermally caused deformations of the object 20 for a thermal discharge to be able to be carried out on the base plate 19. In order to support this, with the exception of a toothed wheel 21 which in this example represents the usable portion of the object 20, there are produced support structures 22 which are connected to the base plate 19. These support structures 22 stabilize, on the one hand, the object 20, but above all they provide better thermal discharge in the base plate 19. The support structures 22 extend transversely relative to the construction face A between the base plate 19 and the toothed wheel 21 so that it is connected only indirectly via the support structures 22 to the base plate 19. This facilitates inter alia removal of the toothed wheel 21 from the base plate 19 while reducing the risk of any damage.

After the layered construction of the object 20 has been completed, the belt conveyor 2 transports the base plate 19 with the completed object 20 further in the transport direction T to a removal region 1.2. During this time, the production of the next object 20 already begins. Optionally, a cooling device 12 and/or a heating device 13 may be provided, in order to control the temperature of the produced object 20 or the surrounding powder 4.

The bottom plate 5 terminates in the removal region 1.2 which leads to metal powder 4 being able to trickle through the open structure of the belt conveyor 2 from the base plate 19 and the object 20 and being accumulated in a collection container 14. This collection container 14 is in turn in contact with the storage container 8 via a return line 15 so that (for example, by a powder conveyor which is not illustrated in this instance, for example, a suction device) powder 4 which has not been used can be returned again. The powder may in this instance be conveyed in a continuous or discontinuous manner. However, it may also be advantageous for the air humidity to be controlled and/or for the powder to be prepared, sorted or sieved before a return is carried out. For reasons of clarity, corresponding devices are not shown in this instance. After at least a portion of the powder 4 has trickled away, the base plate 19 is removed from the belt conveyor 2 and the object 20 including the support structures 22 is removed from the base plate 19. Afterwards, the support structures 22 can be separated from the toothed wheel 21. The separation processes mentioned may also be carried out outside the housing 16.

FIG. 2 shows another form of a production installation 1. Many elements thereof correspond to those of the installation in FIG. 1 and are thus not explained again. In this instance, however, there are provided two belt conveyors 2 which extend in a parallel manner and between which a plurality of base plates 19 are transported. Each of the two belt conveyors 2 carries in this instance an end of each base plate 19. The transport direction T extends in this instance parallel with a vertical V. The production of the object 20 by means of layered application of powder 4 and partial melting thereof is carried out in this instance in a similar manner to the form of FIG. 1. In the example according to FIG. 2, the construction face A extends parallel with the horizontal H. Since the base plate 19 also extends in a horizontal manner, it forms a lower-side support for the applied powder 4. This is secured laterally by the belt conveyors 2 and by the side walls which are not illustrated in this instance. Whilst in this example the production region 1.1 is located at the upper end of the belt conveyors 2, the removal region 1.2 is provided at the lower end thereof. At that location, the base plate 19 with the object 20 can be decoupled from the belt conveyors 2 or simply fall away, whereby the lower-side support of the powder 4 is omitted. The powder may, as schematically illustrated, trickle or fall into a collection container 14. From there it can in turn be returned via a return line 15 to a storage container 8 for the application device 3. There are also produced in this example support structures 22 which, after reaching the removal region 1.2, are removed together with the remaining object 20 from the base plate 19, wherein the toothed wheel 21 is subsequently separated from the support structures 22.

What is claimed is:

1. An additive production method of producing an object, the additive production method comprising:
    applying metal powder in a production region in layers, by an application device, to at least one base member along a construction face, wherein the at least one base member and the construction face extend across a bottom plate at an angle relative to a horizontal that is less than an angle of repose of the metal powder, the metal powder being partially melted by a laser beam and subsequently solidified such that support structures extending transversely toward the construction face are produced on the at least one base member and the object is connected to the support structures;
    transporting, by at least one continuous conveyor, the at least one base member with the object in a transport direction (T) away from the construction face; and
    transporting, by the at least one continuous conveyor, the at least one base member and the support structures with a completed object to a removal region where at least the completed object is removed from the at least one continuous conveyor,
    wherein the support structures discharge heat from the completed object to the at least one base member, the support structures being removed from the at least one base member and the completed object after the removal region has been reached.

2. The additive production method according to claim 1, wherein the at least one base member is removed from the continuous conveyor is a belt conveyor with an open structure, the bottom plate terminates in the removal region, and metal powder trickles through the open structure of the belt conveyor away from the base member and the completed object and is accumulated in a collection container.

3. The additive production method according to claim 1, wherein the transport direction (T) assumes an angle of a maximum of 30° with respect to a horizontal (H).

4. The additive production method according to claim 1, wherein the transport direction (T) assumes an angle of a maximum of 30° with respect to a vertical (V).

5. The additive production method according to claim 1, wherein in the production region, the bottom plate inhibits trickling of powder, and in the removal region metal powder trickles away as a result of gravitational force.

6. The additive production method according to claim 1, wherein powder is returned from the removal region to the application device.

7. The additive production method according to claim 1, wherein, before the completed object is removed from the continuous conveyor, production of a next object begins.

8. The additive production method according to claim 1, wherein the additive production method takes place in a housing containing inert gas.

9. The additive production method according to claim 1 further comprising sidewalls adjoined to sides of the bottom plate.

10. The additive production method according to claim 1 further comprising the step of collecting unused metal powder in a collection container disposed in the removal region.

11. The additive production method according to claim 10, wherein the collection container is in contact with a storage container via a return line and the unused metal powder is returned to the storage container.

12. The additive production method according to claim 1, wherein the application device moves parallel with the construction face.

13. The additive production method according to claim 1, wherein the at least one base member is connected to the at least one continuous conveyor.

* * * * *